May 10, 1955     B. L. DALZELL ET AL     2,708,077
FISHING REEL
Filed July 14, 1952     2 Sheets-Sheet 1
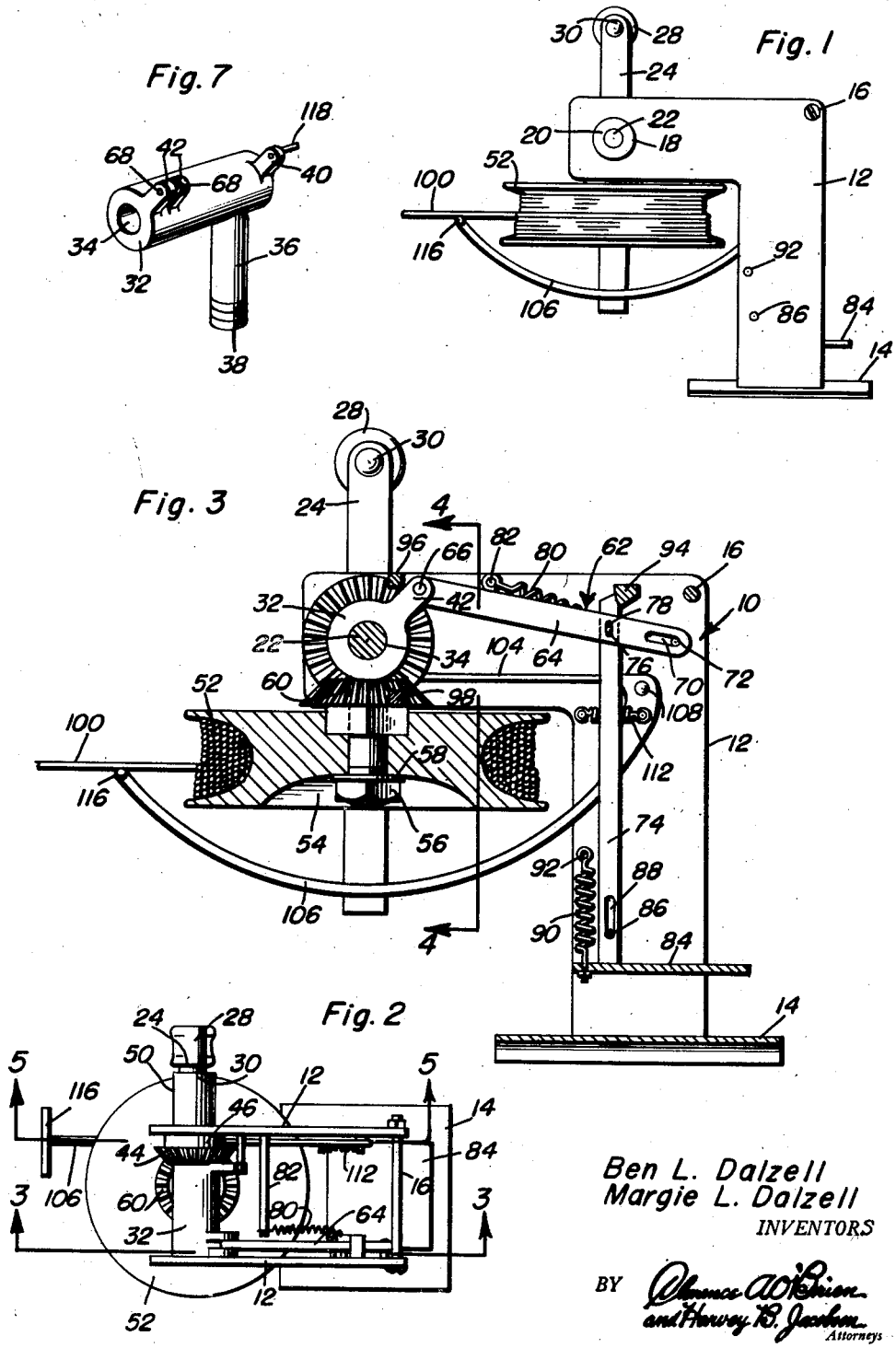
Ben L. Dalzell
Margie L. Dalzell
INVENTORS

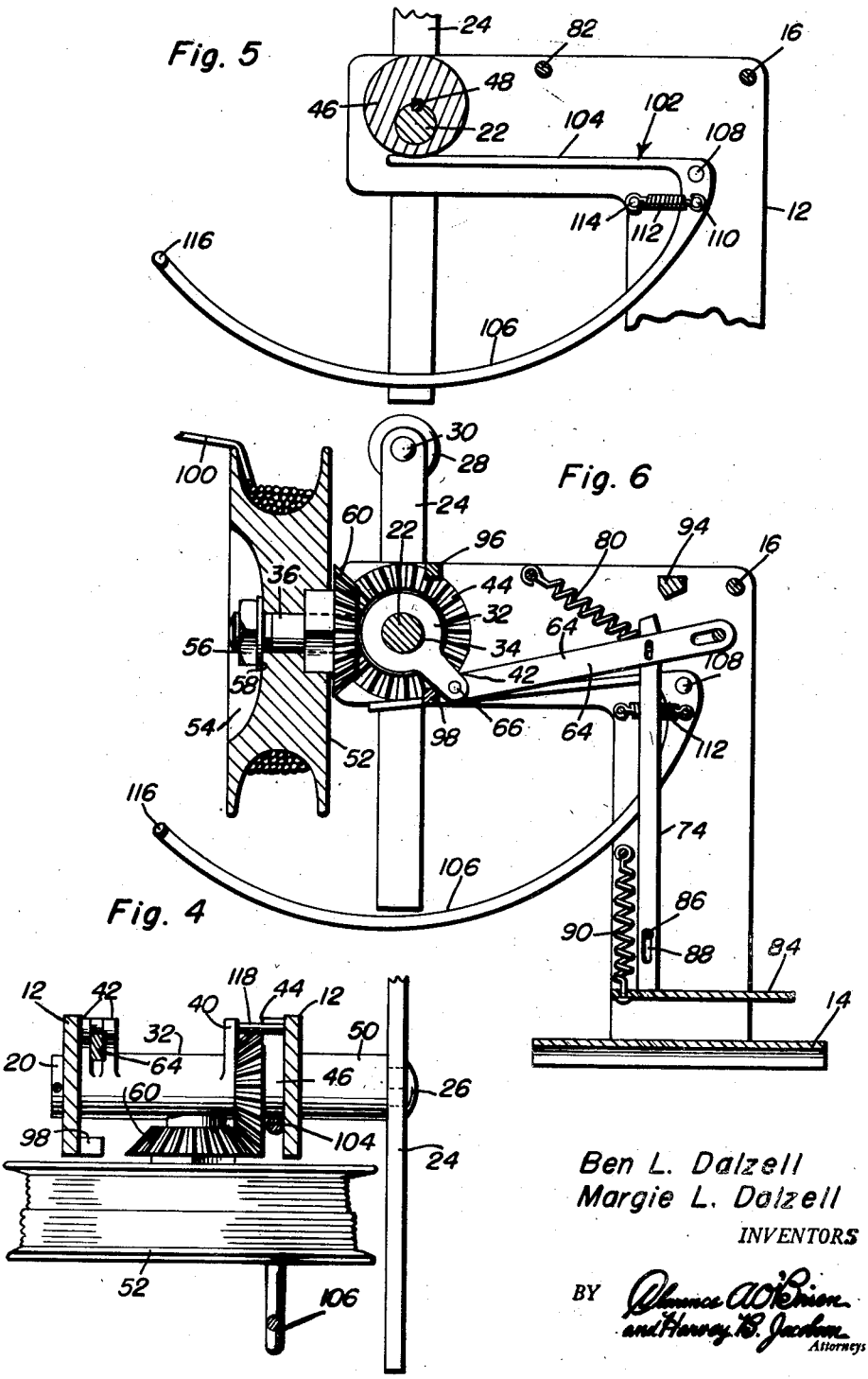

United States Patent Office 2,708,077
Patented May 10, 1955

2,708,077
FISHING REEL

Ben L. Dalzell and Margie L. Dalzell, Tularosa, N. Mex.

Application July 14, 1952, Serial No. 298,802

3 Claims. (Cl. 242—84.4)

This invention relates in general to fishing equipment, and more specifically to improvements in fishing reels. The primary object of this invention is to provide an improved fishing reel which includes a spool movable from a winding position to a casting position, said spool being so disposed in the casting position that the associated fishing line is permitted to freely pay out over one end of the spool.

Another object of this invention is to provide an improved fishing reel which includes a support having a first shaft mounted therein, said first shaft having supported thereby for rotation thereabout a second shaft, said second shaft having mounted thereon a spool for fishing line, said spool being movable from a horizontal position to a vertical position whereby a fishing line may be payed off one side of the same during a casting operation and which may be conveniently wound thereon when the same is in a winding position.

Another object of this invention is to provide an improved fishing reel in which a fishing line receiving spool is pivotable from a winding position to a casting position, said fishing reel also including a level wind mechanism for guiding a fishing line onto said spool, said level wind mechanism being associated with the spool only when the same is in a winding position.

A further object of this invention is to provide an improved fishing reel which has a spool mounted thereon for movement from a winding position to a casting position, means carried by the fishing reel and upper roll by a thumb of a fisherman for moving said spool from the winding position to the casting position, means associated with said actuating means for automatically returning the spool to the winding position.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a side elevational view of the improved fishing reel, which is the subject of this invention, and shows the general outline thereof;

Figure 2 is a top plan view of the fishing reel of Figure 1 and shows the general mechanism thereof;

Figure 3 is an enlarged transverse vertical sectional view taken substantially upon the plane indicated by the section line 3—3 of Figure 2 and shows the specific construction of the fishing reel;

Figure 4 is a transverse vertical sectional view taken substantially upon the plane indicated by the section line 4—4 of Figure 3 and shows the drive means for the spool of the fishing reel;

Figure 5 is an enlarged transverse vertical sectional view taken substantially on the plane indicated by the section line 5—5 of Figure 2 and shows the general construction of the level wind mechanism, the lower portion of the support of the fishing reel being omitted;

Figure 6 is an enlarged transverse vertical sectional view similar to Figure 3 and showing the arrangement of the fishing reel when the spool has been moved to a casting position; and Figure 7 is an enlarged perspective view of a special fitting on which the spool is mounted for rotary movement.

Similar characters of reference designate similar or identical elements and portions throughout the specification and throughout the different views of the drawings.

Referring now to the drawings in detail, it will be seen that the fishing reel, which is the subject of this invention, includes a support, which is referred to in general by the reference numeral 10. The support 10 includes a pair of L-shaped side members 12 which are in spaced parallel relation and are connected together at their lower ends by a longitudinally extending arcuate connector 14. It will be understood that the arcuate connector 14 is adapted to overlie a portion of a fishing rod (not shown) and be connected thereto in the conventional manner. The sides 12 are connected together at their upper rear corners by a transversely extending fastener 16 which is removable in order that the fishing reel may be disassembled.

The forward ends of the sides 12 are provided with aligned openings 18 in which are mounted bearings 20. Carried by the bearings 20 and extending transversely of the support 10 is a drive shaft 22. As is best illustrated in Figure 2, the drive shaft 22 extends outwardly beyond the right hand side 12 and has secured to the outer end thereof an elongated balanced crank 24. The crank 24 is secured to the end of the drive shaft 22 intermediate its ends by a fastener 26 and one end has pivotally connected thereto a grip member 28, the grip member being mounted on a rivet 30 which forms a pivot pin therefor.

Referring now to Figure 7 in particular, it will be seen that there is illustrated an elongated sleeve 32 which has a longtiudinal bore 34 therethrough. Integral with the sleeve 32 and extending downwardly therefrom adjacent one end thereof is a shaft 36 having a threaded end portion 38. The sleeve 32 is also provided with a first lug 40 which projects upwardly and rearwardly therefrom at the end adjacent the shaft 36. Projecting upwardly and rearwardly from the sleeve 32 at the other end thereof is a pair of spaced parallel lugs 42, the lugs 42 being in alignment with the lug 40. The purpose of the lugs 40 and 42 will be explained in more detail hereinafter.

Referring now to Figure 4 in particular, it will be seen that the sleeve 32 is mounted on the drive shaft 22 between the sides 12 with the end thereof provided with the lugs 42 being in engagement with the inner surface of the left hand side 12. Mounted on the drive shaft 22 and engaging the other end of the sleeve 32 is a first bevel gear 44. The bevel gear 44 engages a cam 46 which is keyed on the drive shaft 22 by a key 48, as is best illustrated in Figure 5. It will be noted that the cam 46 engages the inner surface of the right hand side 12 and prevents side play of the sleeve 32 and the first bevel gear 44. The transverse movement of the drive shaft 22 is also prevented by sleeve 50 which is disposed between the crank 24 and the outer surface of the right hand side 12.

Mounted on the shaft 36 for rotation thereabout is a spool 52. The spool 52 is provided with a recessed underside 54 in which is positioned a nut 56 and a washer 58 mounted on the threaded end 38 of the shaft 36 to retain the spool 52 thereon. Locked to the upper side of the spool 52 is a second bevel gear 60, the second bevel gear being disposed at right angles to the first bevel gear 44 and intermeshing therewith.

It will be noted that the sleeve 32 is free to rotate about the drive shaft 22. In order that the sleeve 32 may be retained in the desired selected positions and selectively moved between the same, the fishing reel is provided with actuating means, which is referred to in general by the reference numeral 62.

The actuating means 62 includes a first link 64 which has a forward end thereof positioned between the lugs 42 and pivotally connected thereto by a transverse pivot pin 66, the pivot pin being disposed in aligned bores 68 in the lugs 42. The rear end of the link 64 is provided with an elongated slot 70 in which is mounted a transverse pin 72, the transverse pin 72 being carried by the left side 12. In order that the link 64 may be shifted longitudinally there is provided a vertical link 74 which is pivotally connected to the link 64 by a transverse pivot pin 76. It will be noted that the pivot pin 76 is disposed in a vertical slot 78 in the rear portion of the link 64 and is carried by the link 74 adjacent the upper end thereof. In order that the forward end of the link 64 may be continuously urged forwardly, the pivot pin 76 has connected thereto a spring 80 whose forward end is connected to a transverse pin 82 carried by the right side 12.

In order that the vertical link 74 may be actuated, it is connected at its lower end to a thumb engageable member 84. The thumb engageable member 84 is disposed between the two sides 12 and is vertically spaced above the connecting member 14. The lower end of the vertical link 74 is guided by a transverse pin 86 carried by the left side 12 and disposed in an elongated vertical slot 88 in the lower portion of the vertical link 74.

It will be seen that connected to the forward portion of the thumb engageable member 84 is a vertically extending spring 90 to whose upper end is connected a transverse pin 92 carried by the left side 12. The spring urges the link 74 upwardly and retains the links 64 and 74 in positions illustrated in Figure 3, it will also be noted that the link 64 is urged forwardly and locked in the position illustrated in Figure 3 by engagement of the upper end of the vertical link 74 with a beveled surface of a guide member 94.

In order that the spool 52 may be retained in a horizontal or winding position, the left side 12 is provided with an upper stop member 96 which engages the upper surfaces of the lugs 42 to limit counter-clockwise rotation of the sleeve 32, as viewed in Figure 3. When the thumb engageable member 84 is urged downwardly the links 64 and 74 are moved to the positions illustrated in Figure 6. At this time the link 74 is urged forwardly by the spring 80 and the sleeve 32 is urged in a clockwise direction. In order that the rotation of the sleeve 32 may be limited to a point whereby the spool 52 is in a vertical position, the left side 12 is also provided with a lower stop member 98 which limits clockwise rotation of the sleeve 32.

In order that the fishing line 100 reeled on the spool 52 may be evenly reeled thereon, the fishing reel is provided with a level wind mechanism which is referred to in general by the reference numeral 102. The level wind mechanism includes a member having a horizontal leg 104 and an arcuate upwardly opened substantially horizontal leg 106, the legs 104 and 106 being integral. The legs 104 and 106 are pivotally connected to the right side 112 by a pivot pin 108 which is disposed at their intersections. The forward end of the horizontal leg 104 underlies the cam 46 and is moved vertically by the same in response to rotation of the drive shaft 22. In order that the horizontal leg 104 may be retained in engagement with the cam 46, the leg 106 has connected to a pivot pin 110 carried by the upper portion thereof a spring 112. The other end of the spring 112 is connected to a pin 114 carried by the right side 12 in alignment with the pin 110. It will be seen that the spring 112 urges the leg 106 forwardly and upwardly with resulting upward movement of the leg 104. As is best illustrated in Figure 2, the forward end of the leg 106 is provided with a transverse bar 116 which underlies the fishing line 100 and guides the same onto the spool 52.

In order that the level wind mechanism 102 may be automatically disengaged with the fishing line 100 upon movement of the spool 52 to a vertical or casting position, the lug 40 is provided with an outwardly projecting pin 118. The pin 118 engages the horizontal leg 104 when the sleeve 32 is rotated in a clockwise direction and urges the same downwardly to move the transverse bar 116 downwardly out of alignment with the spool 52.

In the operation of the fishing reel, which is the subject of this invention, the same may be utilized in the conventional manner with the spool 52 in a horizontal position, as is best illustrated in Figure 3. However, when it is decided to use the fishing reel for casting a fishing rod to which the fishing reel attached is swung in the backward portion of the cast in the conventional manner, then the fishing rod is swung forward to cast the line 100 therefrom. At this time the thumb engaging member 84 is depressed with the result that the spool 52 is swung forwardly and upwardly to the casting position illustrated in Figure 6. The fishing line 100 is then free to pay off the end of the spool 52 without resistance to the movement thereof from the spool. Also, by permitting the fishing line 100 to pay out off the side of the spool 52 backlash is prevented. When the end of the cast is reached, the thumb engaging member 84 is released and the spool 52 is moved to its horizontal or winding position due to the urging of the spring 90. When the spool 52 is in the horizontal position and the drive shaft 22 is prevented from rotating, the fishing line 100 is locked against paying out from the spool 52.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A fishing reel comprising a support, a first shaft extending transversely of said support and supported thereby at spaced points for rotation, a drive gear secured to said shaft, an elongated sleeve rotatably carried by said shaft, said drive gear and said sleeve being disposed between said points, a second shaft rigidly carried by said sleeve, a spool rotatably carried by said second shaft, a driven gear carried by said spool engaged with said drive gear, means for rotating said first shaft, and means for selectively rotating said sleeve.

2. A fishing reel comprising a support, a first shaft extending transversely of said support and supported thereby at spaced points for rotation, a drive gear secured to said shaft, an elongated sleeve rotatably carried by said shaft, said drive gear and said sleeve being disposed between said points, a second shaft rigidly carried by said sleeve, a spool rotatably carried by said second shaft, a driven gear carried by said spool engaged with said drive gear, means for rotating said first shaft, and means for selectively rotating said sleeve, said last mentioned means including a link pivotally connected to said sleeve in offset relation to the axis thereof, an actuating member connected to said link.

3. A fishing reel comprising a support, a first shaft extending transversely of said support and supported thereby at spaced points for rotation, a drive gear secured to said shaft, an elongated sleeve rotatably carried by said shaft, said drive gear and said sleeve being disposed between said points, a second shaft rigidly carried by said sleeve, a spool rotatably carried by said second shaft, a driven gear carried by said spool engaged with said drive gear, means for rotating said first shaft, and means for selectively rotating said sleeve, said last mentioned means including a link pivotally connected to said sleeve in offset relation to the axis thereof, an actuating member connected to said link, said actuating member being connected to said link by a second link, cam means on said support engaging said second link to insure movement of said spool to its proper winding position.

References Cited in the file of this patent

UNITED STATES PATENTS

| | | | |
|---|---|---|---|
| 2,332,481 | Boor | Oct. 19, | 1943 |
| 2,549,029 | Stalder | Apr. 17, | 1951 |
| 2,586,921 | Delphon | Feb. 26, | 1952 |
| 2,602,602 | Vijande | July 8, | 1952 |
| 2,604,272 | Olsen | July 22, | 1952 |